Patented Oct. 3, 1939                                           2,174,976

UNITED STATES PATENT OFFICE 2,174,976

PREPARING A BACTERICIDAL AGENT AND COMPOSITION OBTAINED FROM REACTION OF META-DIHYDROXYBENZENE AND GUM CAMPHOR

Meyer S. Glauser, Philadelphia, Pa.

No Drawing. Application March 22, 1938,
Serial No. 197,359

4 Claims. (Cl. 167—65)

The present invention relates to a bactericidal agent and composition particularly adapted for the external treatment of infected conditions of the skin, said infected conditions arising from bacteria, parasites and fungi. The composition of the present invention not only kills the bacteria, parasites and fungi, but also promotes healing.

The invention, in its more specific aspect, is directed to a bactericidal composition and a method of producing the same. The bactericidal agent is used in from 1 to 10% prepared in solution of proper solvent, namely, organic oils (alcohol-water) (acetone-water), or held in suspension by proper pharmaceutical methods.

The method and steps of the present invention will be pointed out in connection with the more specific disclosure of the invention.

The following is an illustration as to the method used in the preparation of my invention or bactericidal agent.

Equal parts of meta-dihydroxybenzene and gum camphor are placed in a proper container, preferably a bell flask and heated. The mixture, after 10 or 15 minutes of heating, becomes liquid. The heating process is continued for approximately 30 to 40 minutes and the temperature of this liquid is carefully noted. When a temperature of 225° to 235° C. is reached, slight explosions take place. These explosions are allowed to continue for from 3 to 5 minutes to complete the reaction product. During this heating process, a cork is loosely placed in the neck of the bell flask to prevent volatilization of material used.

It may be well to state that this reaction takes place at room temperature and normal atmospheric pressure. If the reaction is made in vacuo and under different atmospheric pressure, the time limit would vary accordingly.

Differentials have been made of fusion products of meta-dihydroxybenzene and gum camphor at fusion temperatures, namely a reaction product obtained by my herein described invention and products of from 50° to 150° C. The following characteristics have been observed.

Fusion products of 50° to 150° C. will precipitate or crystallize on cooling, and are not stable at ordinary room temperature.

Fusion products of 50° to 150° C. are insoluble in organic oil.

Fusion products of 50° to 150° C. will not destroy staphylococcus bacteria in from 1 to 2 minutes in 1–10% solution as shown by bacteriological tests.

My reaction product obtained, as herein disclosed, at the temperature of 225° to 235° C. will not precipitate or crystallize on cooling. It is stable at ordinary room temperature.

My reaction product is freely soluble in fixed and volatile oils (excepting liquid petrolatum).

My reaction product will destroy staphylococcus bacteria, in 1% solution in from 1 to 2 minutes.

The following is a report of a 5% solution of my reaction product held in suspension, pharmaceutically combined:

|  | Dilution | Time | | | | | |
|---|---|---|---|---|---|---|---|
|  |  | 5 min. | 7½ min. | 10 min. | 12½ min. | 15 min. | |
| Phenol | 1-80 | − | − | − | − | − | B. typhosis. |
|  | 1-90 | − | − | − | − | − | Do. |
|  | 1-100 | + | + | + | + | − |  |
|  | 1-120 | + | + | + | + | − |  |
| Meta dihydroxybenzene gum camphor reaction product. | 1-500 | − | − | − | − | − |  |
|  | 1-600 | − | − | − | − | − |  |
|  | 1-700 | + | − | − | − | − | Do. |
|  | 1-800 | + | + | + | + | − |  |
|  | 1-900 | + | + | + | + | + |  |
|  | 1-1000 | + | + | + | + | + |  |
| Do. | 1-500 | − | − | − | − | − |  |
|  | 1-600 | − | − | − | − | − |  |
|  | 1-700 | − | − | − | − | − | Staph. aureus. |
|  | 1-800 | + | + | − | − | − |  |
|  | 1-900 | + | + | + | + | − |  |
|  | 1-1000 | + | + | + | + | + |  |
| Do. | 1-500 | − | − | − | − | − |  |
|  | 1-600 | − | − | − | − | − |  |
|  | 1-700 | − | − | − | − | − | Strept. non-hemolytic. |
|  | 1-800 | − | − | − | − | − |  |
|  | 1-900 | + | + | − | − | − |  |
|  | 1-1000 | + | + | + | − | − |  |

In relationship to phenol or carbolic acid it will be found that the finished product is able to kill bacteria 6.1 times faster than pure 100% phenol. Organisms used were bacillus typhosis, staphylococcus aureus, and streptococcus non-hemolytic. The finished product of the present invention destroys the staphylococcus aureus about 7.2 times as fast as phenol destroys the same organism, and streptococcus non-hemolytic 7.33 times as fast as phenol destroys the same organism.

My reaction product when incorporated in a proper solvent or carrying medium, or dispersing medium, may be used as a bactericidal agent. The final product herein disclosed will be found valuable in the treatment of infected skin diseases such as Acne (Vulgaris) Impetigo, contagiosa, Epidermophytosis face, toes, feet, hands, etc., Pityrasis, purigo, Tinea circinata, Tinea sycosis, Tinea barbae, and Tinea Axillaris.

My reaction product with or without other additions may be incorporated in a base and used as a soap, or a hair preparation, or as dusting powder.

It may be stated that my reaction product is non-irritating and can be safely applied to different portions of the skin, including the face, the back, and the like. It may well be that the reaction product is the meta dihydroxybenzene camphorate, but it is not desired to be limited by any theory as to the final reaction product. Tests show that the reaction product is capable of destroying bacteria in 1% to 10% or 10% to 1% solutions of proper solvents in 1 to 2 minutes.

The following is an illustrative example of a practical preparation using the reaction product, held in suspension, with added suitable medicinal ingredient for external application, having definite properties as a bactericide, fungicide, and parasiticide owing these properties to the reaction product:

Liquid #1

|  | Per cent |
|---|---|
| Reaction product | 1-10 |
| Acetated sulphide of zinc | 1-5 |
| Hydrated oxide of zinc | 5-10 |
| Hydrated calamine |  |
| Antiseptic essential oils | 1-5 |
| Glycerine | 5-10 |
| Alcohol or acetone | 10-15 |
| Distilled water—q. s.—ad | 100 |

Liquid #2

|  | Per cent |
|---|---|
| Reaction product | 1-10 |
| Organic fixed oil—q. s.—ad | 100 |

Liquid #3

|  | Per cent |
|---|---|
| Reaction product | 1-10 |
| Grain alcohol (95%) | 40 |
| Distilled water—q. s.—ad | 100 |

Liquid #4

|  | Per cent |
|---|---|
| Reaction product | 1-10 |
| Proper solvent—q. s.—ad |  |
| Distilled water—q. s.—ad | 100 |

Liquid #5

|  | Per cent |
|---|---|
| Reaction product | 1-10 |
| Sp. Myrcia | 50 |
| Aqua distillate—q. s.—ad | 100 |

#6 Rectal or vaginal suppositories

Containing ½ to 1 grain of reaction product in suppository base.

Also in ointment form containing 1-10% of reaction product with added medicinal ingredients similar to formula of #1 liquid in proper ointment base.

In all foregoing preparations bactericidal, fungicidal, and parasiticidal properties are due to the reaction product determined by laboratory tests.

I claim:

1. The process of preparing a stable bactericidal composition comprising mixing meta dihydroxybenzene with gum camphor, heating to boiling, at which time slight explosions occur and continuing heating for 5 minutes at which time slight explosions occur and continuing heating for five minutes.

2. A process of preparing a bactericidal composition comprising mixing equal parts of meta dihydroxybenzene with gum camphor and heating to a temperature of 225° to 235° C. at which time explosion occurs; continuing this heating for five minutes thereafter.

3. A reaction product obtained by heating equal parts of meta dihydroxybenzene with gum camphor to a temperature of 225° to 235° C. and continuing heating five minutes, said reaction product being stable at normal temperature and atmospheric pressure, freely fixed and volatile oils (excepting liquid petrolatum), 40% of 95% alcohol, acetone-water mixture, and having definite bactericidal, fungicidal, parasiticidal properties in from 1-10% solution of the reaction product destroying staphylococcus aureus within two minutes and is nonirritating when applied externally to epidermis.

4. A pharmaceutical preparation consisting of a base or vehicle and the reaction product obtained by heating equal quantities of metadihydroxybenzene with gum camphor to boiling, continuing boiling for five minutes.

MEYER S. GLAUSER.